Sept. 25, 1934. R. WEINGAND Re. 19,329

PROCESS OF AND APPARATUS FOR MANUFACTURING SEAMLESS FLEXIBLE TUBES

Original Filed Jan. 9, 1929

INVENTOR
Richard Weingand
BY
Watson, Bristol, Johnson & Leavenworth
ATTORNEYS

Reissued Sept. 25, 1934 Re. 19,329

UNITED STATES PATENT OFFICE 19,329

PROCESS OF AND APPARATUS FOR MANUFACTURING SEAMLESS FLEXIBLE TUBES

Richard Weingand, Bomlitz, near Walsrode, Germany, assignor to Sylvania Industrial Corporation, Fredericksburg, Va., a corporation of Virginia Original No. 1,864,006, dated June 21, 1932, Serial No. 331,379, January 9, 1929. In Germany January 25, 1928. Application for reissue April 4, 1934, Serial No. 719,003

10 Claims. (Cl. 18—57)

This invention relates to a process of and apparatus for manufacturing seamless flexible tubes from cellulose solutions, particularly viscose.

It has already been proposed to make seamless flexible tubes from solutions of cellulose by forcing the originating solution, under considerable pressure, through a long passage formed between two coaxial cylinders, and to bathe the resulting layer with a precipitant liquid, inside and out simultaneously, on issuing from said passage, compressed air being admitted at the same time into the interior of the tube in order to preserve its tubular shape. The employment of compressed air and pressure complicates this method of operation, and the requisite apparatus therefor, and easily leads to working troubles. Moreover, the admission of compressed air into the interior of the tube in course of formation, makes it very difficult to obtain a uniform thickness of wall and a uniform diameter throughout the flexible tube, since in practice, the air pressure is not uniform, and the resulting tube is still very ductile. Attempts have therefore been made to produce seamless flexible tubes from cellulose solutions by immersing corresponding formers into the originating solution; but only comparatively short tubes can be obtained by this method.

The present invention contemplates the manufacture of seamless tubing of any desired length, by a novel method of operation and improved apparatus, and in a continuous manner, without the aid of positively applied pressure or compressed air whereby a product is obtained possessing superior properties of strength and elasticity and having a uniform wall thickness and a uniform diameter.

In the accompanying drawing.

In the apparatus of the invention there is provided an annular nozzle positioned to extrude a solution downwardly and a guide member positioned coaxial therewith and disposed beneath the nozzle so as to interiorly support a tube immediately upon extrusion from the nozzle. The guide member is cylindrical in form and has a uniform diameter equal to that of the nozzle. There is provided also a conduit for supplying the cellulose solutions to the nozzle, and a conduit for supplying a coagulant to the interior of the extruded tube and means for supplying a coagulant to the exterior of the tube at a distance from said nozzle.

In the practice of the invention, a suitable cellulose solution is extruded downwardly, preferably solely by gravity through an annular nozzle, the extruded tube being interiorly supported by passing it over a guide member. The interior of the extruded tube is coagulated without coagulating the exterior; thereafter the exterior of the tube is coagulated, the internal coagulant being supplied in an amount such that no excess thereof accumulates in the interior of the tube after the coagulation is complete.

Preferably, the flowing of the cellulose solution from the annular nozzle to the precipitating bath takes place along a guide member bathed with precipitant liquid inside the flexible tube to be formed. The cellulose solution is coagulated internally immediately on issuing from the nozzle and assuming the tubular form. The layer of precipitant which surrounds continuously and uniformly the guide member on its whole surface and length enables the formed tube of cellulose solution to slide along the guide member by gravity alone towards the precipitating bath. Thus, a shrinkage during this sliding movement is prevented by guiding the moving layer on a solid body during the coagulation. The resulting tube detaches itself automatically from the lower end of the guide member and then, is coagulated exteriorly by a suitable coagulant. At least part of the guide member extends above the level of the liquid in the bath. The amount of the coagulant supplied to the guide member for bathing the same, is preferably so adjusted that it will be completely consumed during the coagulation from the inside so that no excess of liquid accumulates in the interior of the tube during the formation of the tube.

The accompanying drawing shows by way of example several embodiments of apparatus suitable for carrying the process according to the invention into practical effect.

Figure 1:
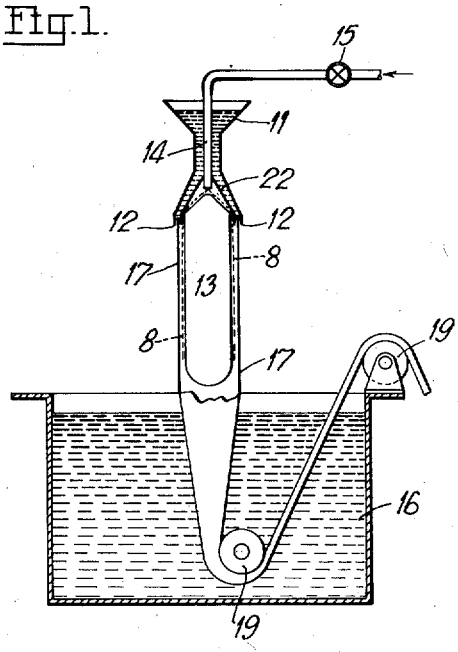
Fig. 1 is a sectional view in side elevation of one embodiment of the novel apparatus of the invention.

In the embodiment of the invention illustrated in Fig. 1, the cellulose solution is fed into a funnel 11 which merges into an annular nozzle 12, into the inner rim of which projects a guide member 13, which may, for example, be cylindrical. A tube 14 passing through the annular nozzle 12 serves for supplying a coagulating liquid to the guide member 13, and is provided with a control valve 15. Below the guide member 13 is a vessel 16 containing a coagulating bath. The cellulose solution issues from the annular nozzle 12 and flows, by gravity, along the guide member 13.

This guide member is continuously irrigated all over with coagulating liquid issuing from the supply tube 14 as illustrated diagrammatically by the dotted line 8 so that the cellulose solution is immediately coagulated internally on issuing from the annular nozzle. The descending tube 17 thus formed detaches itself automatically from the lower end of the guide member 13, and sinks into the bath in vessel 16 where the external coagulation is effected.

The solidified tube 17 can then be removed from the vessel 16 by means of rollers 19, and can be treated in a continuous manner in the usual regenerating, washing, bleaching, desulphurizing, colouring and plasticizing baths, followed, if desired, by drying. By adjusting the control valve 15, the supply of coagulating medium to the guide member 13, and thereby the rate of removal of the tube can be regulated.

Figure 2:
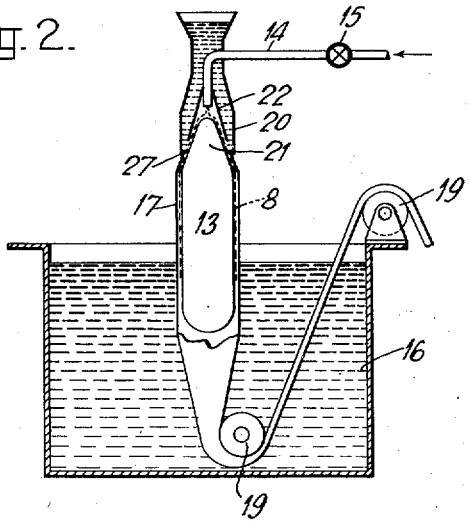
Fig. 2 is a sectional view in side elevation of another embodiment of the apparatus of the invention.

As illustrated in Fig. 2, the annular nozzle 12 of Fig. 1, may be replaced by a cylindrical tube 20, into which is inserted the slightly conical upper end 21 of a guide member 13 disposed coaxial with the tube 20, so that the thickness and form of the tube in course of formation, is determined by the space between these two members which may be adjustable. In order to ensure the supply of coagulating medium to the guide member 13, the tube 14 serving to supply the same, may be provided at its lower end with a conical cover 22.

Figure 3:
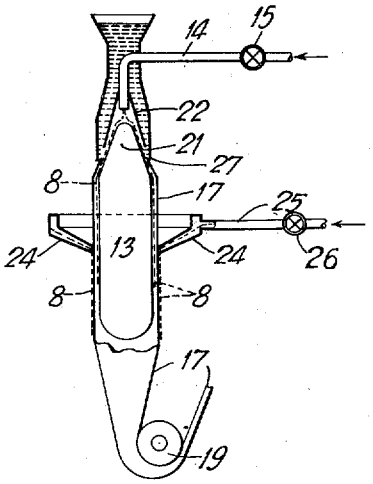
Fig. 3 is a sectional view in side elevation of a further embodiment of the apparatus of the invention.

Fig. 2 further shows that the external coagulation of the tube may also be effected while the tube is still on the guide member 13, inasmuch as this member may, for example, be partly immersed in the coagulating bath. In the embodiment of the apparatus shown in Fig. 3, the use of a vessel containing a coagulating bath is dispensed with and the tube externally irrigated with precipitant by means of an annular nozzle 24 surrounding the tube and supplied with coagulant by a suitable inlet tube 25 provided with a valve 26. The spray nozzle 24 is disposed so that the spray of coagulant 8 strikes the tube 17 at a distance below the tube-forming orifice 27, and the point of internal coagulation of the tube.

The tube resulting from the novel process of the invention may serve for any desired purposes and may be employed for example as an artificial sausage casing.

I claim:

1. In an apparatus for the manufacture of seamless flexible tubes from cellulose solutions, the combination of an annular nozzle positioned to extrude the solution downwardly, a guide member having a uniform diameter equal to that of the nozzle and disposed beneath and coaxial with said nozzle so as to interiorly support a tube immediately upon extrusion from said nozzle, means for supplying cellulose solution to said nozzle, means for supplying a coagulant to said guide member adjacent the nozzle, and means for supplying a coagulant to the exterior of the extruded tube at a distance from said nozzle.

2. In an apparatus for the manufacture of seamless flexible tubes from cellulose solutions, the combination of an annular nozzle positioned to extrude the solution downwardly and comprising two concentric cylindrical members, a guide member having a uniform diameter equal to that of the nozzle and disposed beneath and coaxial with said nozzle so as to interiorly support a tube immediately upon extrusion from said nozzle, means for supplying cellulose solution to said nozzle, means for supplying a coagulant to bathe said guide member adjacent the nozzle, and a vessel containing a coagulating bath positioned beneath said nozzle, at least part of said guide member extending above the level of the liquid in said bath.

3. In an apparatus for the manufacture of seamless flexible tubes from cellulose solutions the combination of a cylindrical tube, a cylindrical guide member coaxial therewith having an end disposed within said cylindrical tube and forming with said tube an annular nozzle positioned to extrude the solution downwardly, said guide member having a uniform diameter equal to that of the nozzle, means for supplying cellulose solution to said tube, means for supplying a coagulant to bathe said guide member adjacent the nozzle, and means for supplying a coagulant to the exterior of the extruded tube at a distance from said nozzle.

4. In an apparatus for the manufacture of seamless flexible tubes from cellulose solutions, the combination of an annular nozzle positioned to extrude the solution downwardly, a guide member having a uniform diameter equal to that of the nozzle and disposed beneath and coaxial with said nozzle so as to interiorly support a tube immediately upon extrusion from said nozzle, means for supplying cellulose solution to said nozzle, means for supplying a coagulant to bathe said guide member adjacent the nozzle, and a second annular nozzle surrounding the guide member and disposed to supply coagulant to the exterior of the extruded tube at a distance from said nozzle.

5. In a process for the manufacture of seamless flexible tubing from cellulose solutions, the steps which comprise extruding a suitable cellulose solution downwardly through an annular nozzle, interiorly supporting the extruded tube, coagulating the interior of the tube without coagulating the exterior of the tube, thereafter coagulating the exterior of the tube.

6. In a process for the manufacture of seamless flexible tubing from viscose solutions, the steps which comprise extruding a suitable viscose solution downwardly through an annular nozzle, interiorly supporting the extruded tube, coagulating the interior of the extruded tube without coagulating the exterior of the tube, and thereafter coagulating the exterior of the tube, the internal coagulant being supplied in an amount such that no excess thereof accumulates in the interior of the tube.

7. In a process for the manufacture of seamless flexible tubing from cellulose solutions, the steps which comprise extruding a suitable cellulose solution downwardly through an annular nozzle, interiorly supporting the extruded tube, coagulating the interior of the extruded tube immediately as it issues from said nozzle without coagulating the exterior of the tube, and thereafter coagulating the exterior of the tube.

8. In a process for the manufacture of seamless flexible tubing from cellulose solutions, the steps which comprise extruding a suitable cellulose solution downwardly through an annular nozzle, supporting the extruded tube by means of a guide member, bathing the guide member with a coagulant of the solution, coagulating the interior of the tube on the guide member without coagulating the exterior, and thereafter coagulating the exterior of the tube after it has passed from said guide member.

9. In a process for the manufacture of seamless flexible tubing from cellulose solutions, the steps which comprise extruding a suitable cellulose solution downwardly through an annular nozzle, interiorly supporting the extruded tube by means of a guide member, bathing the guide member with a coagulant of the solution, coagulating the interior of the tube on the guide member without coagulating the exterior, and thereafter coagulating the exterior of the tube, the rate of extrusion being controlled by varying the amount of coagulant supplied to bathe the guide member.

10. In a process for the manufacture of seamless flexible tubing from viscose solutions, the steps which comprise extruding a suitable viscose solution downwardly through an annular nozzle solely by the force of gravity, interiorly supporting the freshly extruded tube by means of a guide member, bathing the guide member with a coagulant of the solution, coagulating the interior of the tube on the guide member without coagulating the exterior, and thereafter coagulating the exterior of the tube after it has passed from said guide member, the internal coagulant being supplied in an amount such that no excess thereof accumulates in the interior of the tube.

RICHARD WEINGAND.